United States Patent [19]
Bergquist et al.

[11] Patent Number: 5,857,281
[45] Date of Patent: Jan. 12, 1999

[54] WILD-GAME SCENT DISPENSER

[76] Inventors: James S. Bergquist, 23562 Campestre, Mission Viejo, Calif. 92691; Jon A. Bergquist, 56 Renoir Dr., Osterville, Mass. 02655

[21] Appl. No.: 499,114

[22] Filed: Jul. 6, 1995

[51] Int. Cl.⁶ .................................................. A01M 31/00
[52] U.S. Cl. ...................................................... 43/1; 239/47
[58] Field of Search ....................... 43/1, 2, 129; 239/47, 239/57; 215/306

[56] References Cited

U.S. PATENT DOCUMENTS

| | | |
|---|---|---|
| 4,302,899 | 12/1981 | DeHart . |
| 4,374,571 | 2/1983 | Hirvela . |
| 4,506,806 | 3/1985 | Lincoln et al. . |
| 4,667,430 | 5/1987 | Ziese, Jr. . |
| 4,682,715 | 7/1987 | Reeves . |
| 4,722,477 | 2/1988 | Floyd . |
| 4,726,584 | 2/1988 | Bishop . |
| 4,735,010 | 4/1988 | Grinarml . |
| 4,771,563 | 9/1988 | Easley . |
| 4,773,177 | 9/1988 | Gray, II et al. . |
| 4,788,787 | 12/1988 | Konietzki . |
| 4,802,626 | 2/1989 | Forbes et al. . |
| 4,937,431 | 6/1990 | Jameson et al. . |
| 4,944,940 | 7/1990 | Christenson, II . |
| 4,953,763 | 9/1990 | Kierum et al. . |
| 4,989,547 | 2/1991 | Eaton . |
| 5,029,408 | 7/1991 | Smith . |
| 5,094,025 | 3/1992 | Daniels . |
| 5,123,657 | 6/1992 | Colt et al. . |
| 5,161,646 | 11/1992 | Aurich et al. . |
| 5,220,741 | 6/1993 | Burgeson . |
| 5,263,274 | 11/1993 | Speed . |
| 5,279,062 | 1/1994 | Burgeson . |
| 5,465,521 | 11/1995 | Baker et al. ................................. 43/1 |

*Primary Examiner*—Michael J. Carone
*Assistant Examiner*—Darren Ark
*Attorney, Agent, or Firm*—James L. Etheridge

[57] ABSTRACT

The present invention relates to a device designed to both store and dispense liquid scent, and, more particularly, to an animal liquid scent dispenser. The device includes a container having a generally hollow interior, a side wall, a closed end, an open end and a cover hingedly attached to the container. Within the container, a basket holds an absorbent body which retains the liquid scent. The basket is connected by tether to a fastening ring, which allows the device to be secured to an external object, such as a tree branch for support, when in use. The cover is provided to secure and seal the open end of the container to prevent loss of the scent or liquid. Alternatively, the cover may be removed from the container to permit scent to be released from the open end of the container.

12 Claims, 1 Drawing Sheet

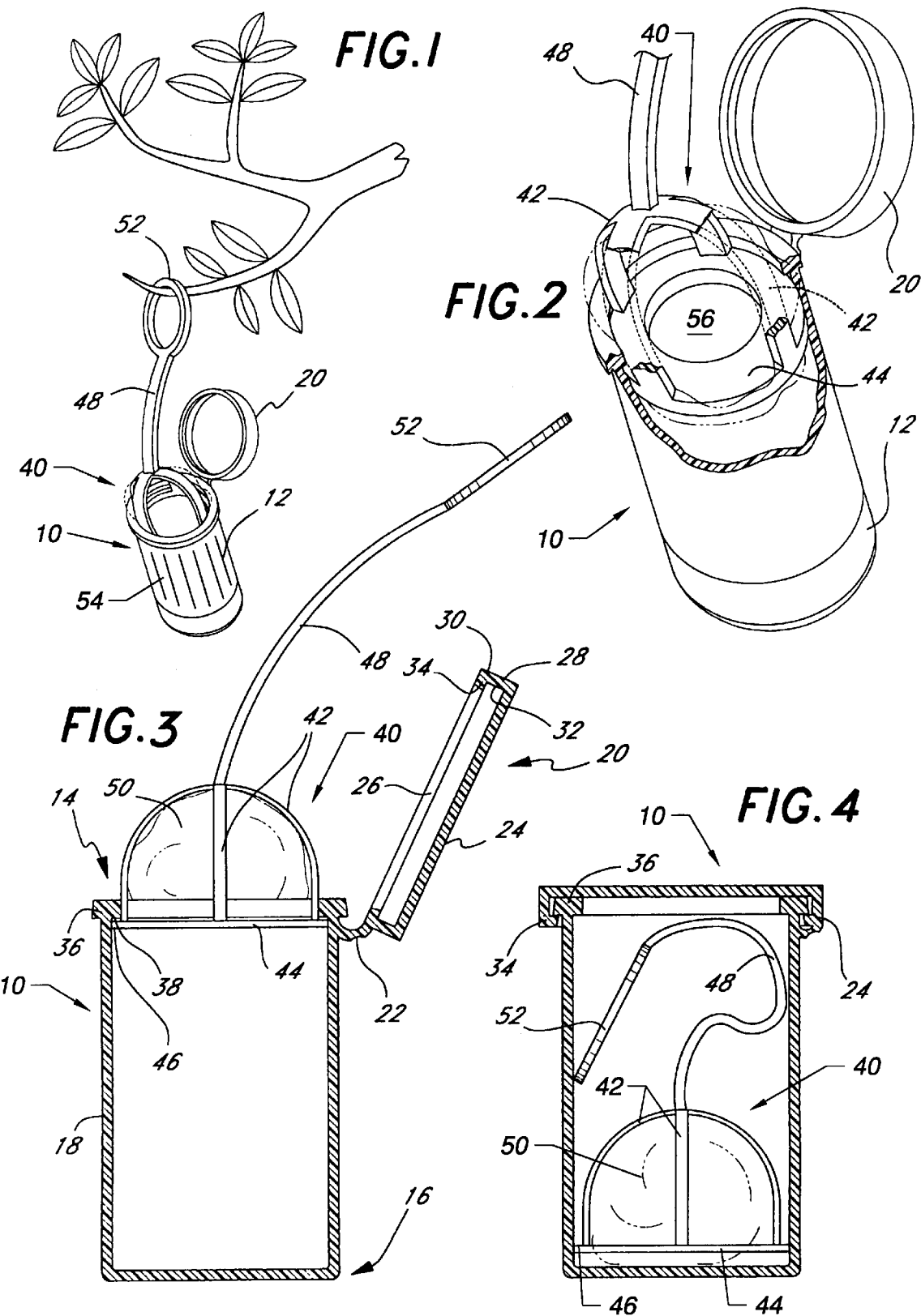

WILD-GAME SCENT DISPENSER

BACKGROUND OF THE INVENTION

1. Field of the Invention

The present invention relates to a liquid scent dispenser and, more particularly, to an animal liquid scent dispenser.

2. Description of Related Art

Aromatic materials which generate particular scents to lure or attract particular game animals toward a position within range of a hunter are well known. Liquid animal scents can also be used to mask a human's scent. These liquid lures are widely available commercially in concentrated liquid form, and their use for attracting prey is especially popular among hunters. For example, in deer hunting, it is well known that doe urine is especially effective for luring bucks to a position near where a hunter is stationed. Thus, a hunter may apply liquid lure near his blind or place of hiding. Alternatively, a scent comprised of buck urine may also be used, since a dominant buck will be attracted to chase away the apparent intruder from his territory. Still further, deer hunters may utilize the previously-mentioned liquid urine scents near scrape marks in the ground formed by the hooves of passing deer. Consequently, it is advantageous for the hunter to distribute small quantities of the animal scent near the area of the scrapes, often by sprinkling the liquid scent on the ground.

In addition to hunters, liquid animal scents are also used by trappers, and by wild life photographers and other nature enthusiasts. Whatever the specific use, artificial scents are essential for most, if not all users, to achieve successful results in their hunting, trapping, and other outdoor activities.

While these lures are effective, they are normally quite expensive. Because of the high cost, most hunters are very careful to avoid overly generous applications or spilling of the lure. Thus, there exists a need among hunters for a dispenser of liquid animal lures which is easy to use, which provides a means for preventing spillage of the lure, and which avoids the expense of overgenerous application. Further, it is desirable to have a means to effectively expose the liquid scent to the air to maximize the vaporization of the liquid and enhance the distribution of the aroma.

Prior art devices for dispensing liquid animal scents have proven unsatisfactory for a number of reasons. Often prior art dispensers for liquid animal lures are awkward to use, resulting in the spillage or splashing of the lure, and the creation of a malodorous mess on the user's clothing or within his vehicle. One prior art device is a simple sponge or pad attached to a piece of plastic which is securable to the user's clothing. However, this device provides no means to stop the scent release by enclosing the saturated sponge or pad when the scent is no longer required. As a result, the scent becomes an offensive odor as it continues to be released in the hunter's vehicle or home. Further, the prior art teaches that the pad be disposed of or cleaned after each use.

Another prior art device uses a cover which screws down around the scented body to shut off the odor. However, as the cover is unscrewed and the scent-carrying body is exposed, not only is the scent released, but undesirable and wasteful leakage of the scented liquid occurs if the user accidentally oversaturates the pad. Other prior art devices are vials or bottles of liquid scent left on the ground. This may result in poor vapor distribution, as well as overturning of the bottle due to the wind or other force which results in the expensive liquid scent being spilled onto the soil.

It would be very desirable for outdoor enthusiasts to have a scenting device which eliminates the messiness inherent in the prior art devices. What is needed is a scenting device which is simple, long-lasting, reusable, and convenient, and provides a dependable seal allowing the user to prevent the release of the scent. The present invention answers these needs and provides other benefits which will be detailed below.

SUMMARY OF THE INVENTION

The present invention is a device designed to both store and dispense liquid scent. The device includes a container having a generally hollow interior, a side wall, a closed end, and an open end. Within the container, a basket holds an absorbent body which retains the liquid scent. The basket is connected by a tether to a fastening ring, which allows the device to be secured to an external object, such as a tree branch for support, when in use. A cover is hingedly attached to the container. The hinge connection assures that the cover will not be misplaced whether the device is in use or not. The cover secures the open end of the container in a scent-retaining mode to seal the container and prevent loss of the scent. Alternatively, in a scent-releasing mode, the cover may be removed to permit the scent to escape from the open end of the container.

According to one aspect of the present invention, there is provided a scent-dispensing device having a cover designed to be positioned on the container of the device to allow either the release of the scent from the container or the sealing of the scent within the container. According to another aspect of the invention, a scent-holding body is provided which can be extended from the device and easily returned to the interior of the container for further use.

A further aspect of the invention provides a means for securing the entire device to a separate object, such as the hunter's outer clothing or a bush. Another aspect of the invention provides a means to effectively expose the liquid scent to the air to maximize the vaporization of the liquid and enhance the distribution of the aroma.

Still further, another aspect of the device provides a scenting device for outdoor enthusiasts which eliminates the messiness inherent in the prior art devices by providing a device with a reusable dependable seal to control the release of the scent on demand.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of the present invention showing the elements of the invention in a scent-releasing mode, suspended from a tree limb;

FIG. 2 is a perspective view of the present invention as seen in FIG. 1, with portions broken away and shown in cross-section;

FIG. 3 is a cross-sectional view of the present invention showing the elements of the invention in a scent-releasing relation; and FIG. 4 is a cross-sectional view of the present invention showing the elements of the invention in a scent-sealing relation.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a device designed to both store and dispense liquid animal scent, the device being simple, long-lasting, reusable, convenient, and providing a dependable seal against the undesirable release or leakage of the scent.

Referring now to the drawings wherein like reference numerals refer to the same aspect of the invention throughout the several views, FIG. 1 is a perspective view of the preferred mode of use of the present invention showing the elements of the invention suspended from a tree limb in a scent-releasing mode.

FIGS. 3 and 4 illustrate the present invention in its two modes of use. In FIG. 3, the parts of the device are positioned in a scent-releasing mode so that a scent contained in the device 10 can be released from the device. In FIG. 4, the parts of the device are positioned in a sealing mode with respect to one another to prevent the release of scent from the device. These two modes will be discussed in further detail after the following discussion of the various individual parts of the device 10, herein referred to as the scent dispenser.

The central aspect of the scent dispenser 10 is a container 12. The container 12 may be configured in a variety of suitable shapes, but in the preferred embodiment, the container 12 is generally circular in cross-section and has a substantially hollow interior. The interior of the container is defined by an open first end 14, a closed second end 16, and a cylindrical side wall 18 extending between the first end 14 and the second end 16. In the preferred embodiment, the side wall 18 is in a substantially perpendicular relation to the first and second ends 14, 16.

The side wall 18 has a sealing lip 36 projecting outwardly from the periphery of the first end 14 of the container 12. Additionally, the side wall 18 has a retaining lip 38 projecting inwardly from the periphery of the first end 14 of the container 12. The function of sealing lip 36 and retaining lip 38 will be described below. The first end 14 forms an opening to receive a cover 20 which is used to seal the device. The cover 20 is hingedly connected to the side wall 18 so as to allow the device to be placed in either a scent-releasing or scent-retaining mode. The hingedly connected cover 20, which is attached to the side wall 18 of the container, assures that the cover 20 will not be misplaced whenever the dispenser is in use. The cover 20 may be attached by any suitable means; however, in the preferred embodiment a living hinge 22 is utilized for its reliability and ease of use.

As seen in FIGS. 1 and 2, in the preferred embodiment, the cover 20 has a generally circular cross-section, and is designed with a diameter sized large enough to enclose the first end 14 of the container 12. The cover 20 (FIG. 3) has a closed or solid end 24, an open end 26, and a cylindrical side wall 28 extending between the two ends 24, 26. The cylindrical side wall 28 has an outer surface 30 and an inner surface 32. Referring now to FIG. 4, means for securing the cover 20 to the container 12 in a scent-retaining mode are located on the interior surface 32 of the cover side wall 28. Along the periphery of the open end 26 of the cover 20, a sealing lip 34 projects inwardly from the periphery. Similarly, a sealing lip 36 projects outwardly from the periphery of the first end 14 of the container 12. In the preferred embodiment, the sealing lips 34, 36 have generally rounded end edges. The end edges are designed to contact and hermetically seal against one another when the container first end 14 is enclosed by the cover 20. As such, the cylindrical side wall 28 of the cover 20 and the cylindrical side wall 18 of the container 12 are constructed to be snapped together by the user so that the surfaces mate, as shown in FIG. 4, when the device is in a scent-retaining mode. This securing means allows the scent dispenser 10 to be utilized in either a scent-retaining or scent-releasing mode.

In addition, the securing means for the container 12 also functions to prevent both the seepage of the liquid and the release of the scent from the container 12 when the cover 20 is properly secured across the first end 14. As can be seen in FIG. 4, the sealing lips 34, 36 with rounded end edges contact and seal against one another to prevent any scent or liquid from accidentally seeping out of the container opening 14.

When not in use, the hollow interior space created between the container's first end 14 and second end 16 provides an enclosed expanse to allow both quick and complete saturation of the absorbent body 50. Further, the hollow interior also provides a volume for the scent to accumulate while sealed prior to being released through the exposed open end 14.

As seen in FIGS. 3 and 4, a means for holding a scent is provided within the interior of the container 12. In the preferred embodiment, the scent-holding means is a sponge-like, absorbent body 50, capable of being saturated with the liquid scent. The absorbent body 50 is positioned within and held in place by a basket 40. The basket 40 is comprised of a plurality of retainer members 42 and a base 44. In the preferred embodiment, the retainer members 42 are narrow linear strips attached to base 44 at evenly spaced points around the periphery of base 44. Retainer member 42 extend from the base 44 and join at a common point equidistant from the base 44. When fashioned in such a manner, the retainer members 42, together with the base 44, form a cage for retaining, therein the absorbent body 50. In the preferred embodiment the base has at least one aperture 56 to provide contact between the liquid in the container and the absorbent body 50. A lip 46 projects outwardly from the periphery of the base 44 of basket 40. Basket lip 46 functions in conjunction with retaining lip 38, which projects inwardly from the periphery of side wall 18 at the first end 14 of the container 12. As shown in FIG. 3, when the dispenser is in the scent-releasing mode, the retaining lip 38 substantially contacts the basket lip 46 and acts to stop the displacement of the basket 40, thus ensuring that the basket 40 is not displaced out of the container 12. The basket 40 is connected by the tether 48 to a fastening ring 52, which allows the device to be secured to an external object, such as a tree branch, for support when in use.

As stated above, the scent-holding means is preferably a sponge-like or absorbent body 50, capable of being saturated with the liquid scent. The absorbent body used should have some flexibility in order to be inserted into and removed from the container 12 through the opening at the first end 14. The absorbent body 50 may be made of reusable material of a type easily cleaned with plain water. The absorbent body 50 may be removed by the user merely by grasping any part of the absorbent body 50 which protrudes past the retaining members 42. The absorbent body 50 is then pulled out through one of the openings between the retainer members 42. The absorbent body 50 is replaced by compacting the absorbent body 50 to reduce its size so that it can be pushed back through the retainer members 42 and arranged within the interior of the basket 40. The scent-holding absorbent body 50 is removable, reusable, and easily cleaned for future uses or for use with a different scent. In the alternative, the absorbent body 50 may simply be replaced.

The invention is also provided with a means for attaching the scent dispenser 10 to a separate object. In the preferred embodiment, the particular means chosen to illustrate this aspect of the invention is a flexible fastening ring 52 affixed to the tether 48. As most clearly seen in FIG. 1, in a scent-releasing mode the flexible fastening ring 52, affixed to the tether 48, is simply suspended from a twig on a tree limb. However, it should be noted that the ring, or whatever other fastening means is utilized, may be a separate item mounted to the cover 20 or the container 10. Because the dispenser 12 can be secured to a nearby tree and subsequently removed therefrom, the dispenser 10 eliminates the need to apply the scent directly to one's clothing or the ground, and thus eliminates a significant amount of inconvenience and wastage which accompanies such applications.

In the preferred embodiment, the entire dispenser 10, including the container 12, the cover 20, the retainer members 42, the tether 48, and the securing ring 52 are all made from molded plastic. Many types of plastic materials may be suitable for the purposes of the invention; however, the plastic should have characteristics which will endure exposure to various outdoor elements and weather conditions. If desired, the exterior of the side wall 18 of the container 12 may be grooved, notched, or otherwise scored as at 54 in FIG. 1 to provide the user with a firmer grip to loosen the cover 20 from its respective container end portion 14.

For use, the dispenser 10 is put into a scent-releasing mode by removing the cover 20 from the container 12. The user then pours a desired amount of liquid scent into the container opening and onto the absorbent body 50. The liquid scent is then allowed to penetrate and saturate the absorbent body 50. Should the user accidently oversaturate the absorbent body 50, the loss of liquid scent is prevented, since the container 12 will act as a reservoir for retaining any excess liquid scent. The container 12 will retain any excess liquid until it is saturated by the absorbent body 50 or, in the alternative, the hollow interior provides a volume for the liquid to evaporate and the scent to accumulate. Either way, the wasting of expensive liquid scent is prevented.

Once the desired amount of liquid scent is applied to the absorbent body 50, the tether 48 is pulled to displace the basket 40 until it extends beyond the first end 14 of the container 12 such that the absorbent body 50 is exposed in the scent-releasing mode. The elements of the container 12 are in the preferred relation for the scent-releasing mode when the basket lip 46 is in substantial contact with the retaining lip 38 of the container 12. At this point, the dispenser 10 is then secured or hung on a twig, bush, or small branch near the user.

When the user no longer requires that scent be released, the dispenser 10 is removed from its secured position, the basket 40 is displaced back into the container 12 along with the tether 48, and the cover 20 is closed on the first end 14 of the container 12. The container 12 will then be sealed and no scent can be released. (See FIG. 4.) When the dispenser 10 is not in use and has been sealed, it can safely be carried on the user's person or in a vehicle without fear that the scent will be released and offend others or create an unpleasant breathing environment.

Numerous characteristics and advantages of the invention have been set forth in the foregoing description, together with the details of the structure and function of the invention. The novel features thereof have also been pointed out in the appended claims. The disclosure, however, is illustrative only, and changes may be made in detail, especially in matters of shape, size, and arrangement of some of the parts within the principles of the invention, to the full extent indicated by the broad general meaning of the terms expressed in the following claims.

What is claimed is:

1. A device for storing and dispensing liquid scent, comprising:

container means for defining a hollow interior, said container means having an opening for providing access to said hollow interior;

cover means for closing said opening;

absorbent means for absorbing liquid scent and dispensing said liquid scent by evaporation;

basket means for retaining said absorbent means therein, said basket means comprising a base and a plurality of retaining members, said base and retaining members being connected together to form a cage with a plurality of apertures therethrough, said base being substantially flat and said retaining members being narrow linear strips which are attached at one of their ends to said base at spaced points around the periphery of said base and which are joined together at the other of their ends to form said cage, and said basket means being movably housed within said container means such that said basket means is selectively stored within said hollow interior and moved to a position substantially outside of said hollow interior for exposing said absorbent means to the atmosphere outside said container means; and tether means for attaching said device to a disparate object, said tether means being attached to said device.

2. The device of claim 1 wherein said cover means is hingedly attached to said container means.

3. The device of claim 2 wherein said cover means hermetically seals said container means.

4. The device of claim 3 wherein said cover means is snap-fit on said container means to close said opening.

5. The device of claim 1 wherein said basket means includes means which cooperates with said container means for preventing complete removal of said basket means from said hollow interior.

6. The device of claim 1 wherein said tether means is attached to said basket means.

7. The device of claim 6 wherein said tether means is attached to the juncture of said other ends of said strips.

8. The device of claim 1 wherein said cage is essentially hemispherical in outline with said base being the base and said strips being arched to form the hemisphere.

9. The device of claim 8 wherein said container means comprises a cylinder having an open end, a closed end, and a side wall connecting said open end with said closed end, and wherein said open end comprises said opening.

10. The device of claim 9 wherein said cylinder has an axial height and said hemisphere has a height less than said cylinder axial height so that said tether can be stored within said container means when said container means is closed.

11. The device of claim 1 wherein said absorbent means is normally enclosed within said cage.

12. The device of claim 11 wherein said absorbent means is compressible so as to be capable of being compacted to reduce its size sufficiently to pass through one of said plurality of apertures.

* * * * *